US010065360B2

(12) United States Patent
Susnjara et al.

(10) Patent No.: US 10,065,360 B2
(45) Date of Patent: Sep. 4, 2018

(54) ADDITIVE MANUFACTURING APPARATUS

(71) Applicant: Thermwood Corporation, Dale, IN (US)

(72) Inventors: Kenneth J. Susnjara, Birdseye, IN (US); Brian Scott Smiddy, Newburgh, IN (US)

(73) Assignee: Thermwood Corporation, Dale, IN (US)

( * ) Notice: Subject to any disclaimer, the term of this patent is extended or adjusted under 35 U.S.C. 154(b) by 0 days.

(21) Appl. No.: 15/626,405

(22) Filed: Jun. 19, 2017

(65) Prior Publication Data

US 2017/0326793 A1  Nov. 16, 2017

Related U.S. Application Data

(63) Continuation of application No. 14/701,631, filed on May 1, 2015, now Pat. No. 9,713,902.

(51) Int. Cl.
*B29C 64/227* (2017.01)
*B33Y 30/00* (2015.01)
(Continued)

(52) U.S. Cl.
CPC .......... *B29C 64/227* (2017.08); *B25J 5/04* (2013.01); *B25J 9/026* (2013.01); *B25J 11/00* (2013.01);
(Continued)

(58) Field of Classification Search
CPC .............. B29C 64/386; B29C 47/0002; B29C 47/0866; B29C 64/227; B29C 64/255; B25J 5/04; B25J 9/026; B25J 11/00
See application file for complete search history.

(56) References Cited

U.S. PATENT DOCUMENTS

| 4,659,018 A * | 4/1987 | Shulman ................. B25J 9/105 239/225.1 |
| 5,808,888 A * | 9/1998 | Susnjara .............. G05B 19/423 700/195 |

(Continued)

FOREIGN PATENT DOCUMENTS

WO  2005/070657 A1  8/2005

OTHER PUBLICATIONS

International Search Report and Written Opinion issued in International App. No. PCT/US2016/028845, dated Aug. 22, 2016 (15 pages).

*Primary Examiner* — Jacob T Minskey
*Assistant Examiner* — Melody Tsui
(74) *Attorney, Agent, or Firm* — Bookoff McAndrews, PLLC

(57) ABSTRACT

A CNC machine including a worktable displaceable along y-axis, a gantry disposed along an x-axis, either fixed or displaceable along the y-axis, a carriage on such gantry displaceable along the x-axis and including a thermoplastic material extrusion conduit, a tool carrier mounted on such carriage displaceable along a z-axis, a dispersion conduit mounted on such tool carrier accommodating an applicator, means mounted on such applicator for extruding a molten bead of a thermoplastic material, a flexible hose interconnecting such molten material forming means and such applicator, a plurality of servomotors for linearly or rotationally displacing such components along or about such axes and a computer for controlling such component displacements.

23 Claims, 7 Drawing Sheets

(51) Int. Cl.
| | |
|---|---|
| *B25J 9/02* | (2006.01) |
| *B25J 19/00* | (2006.01) |
| *B29C 47/00* | (2006.01) |
| *B25J 5/04* | (2006.01) |
| *B25J 11/00* | (2006.01) |
| *B25J 15/00* | (2006.01) |
| *B25J 15/04* | (2006.01) |
| *B29C 47/08* | (2006.01) |
| *B29C 64/106* | (2017.01) |
| *B29C 64/112* | (2017.01) |
| *B29C 64/386* | (2017.01) |
| *B29C 64/307* | (2017.01) |
| *B29C 64/255* | (2017.01) |
| *B29K 101/12* | (2006.01) |
| *B33Y 50/02* | (2015.01) |
| *B33Y 10/00* | (2015.01) |
| *B23Q 5/02* | (2006.01) |
| *B29K 105/00* | (2006.01) |
| *B29C 64/00* | (2017.01) |
| *B29C 64/20* | (2017.01) |
| *B29C 64/321* | (2017.01) |
| *B23Q 3/155* | (2006.01) |

(52) U.S. Cl.
CPC ....... *B25J 15/0019* (2013.01); *B25J 15/0491* (2013.01); *B25J 19/0025* (2013.01); *B29C 47/0002* (2013.01); *B29C 47/0014* (2013.01); *B29C 47/0866* (2013.01); *B29C 64/106* (2017.08); *B29C 64/112* (2017.08); *B29C 64/255* (2017.08); *B29C 64/307* (2017.08); *B29C 64/386* (2017.08); *B33Y 30/00* (2014.12); *B23Q 3/15566* (2013.01); *B23Q 5/02* (2013.01); *B29C 64/00* (2017.08); *B29C 64/20* (2017.08); *B29C 64/321* (2017.08); *B29K 2101/12* (2013.01); *B29K 2105/0067* (2013.01); *B33Y 10/00* (2014.12); *B33Y 50/02* (2014.12)

(56) References Cited

U.S. PATENT DOCUMENTS

| | | | |
|---|---|---|---|
| 6,350,222 | B2 | 2/2002 | Susnjara |
| 2005/0141975 | A1* | 6/2005 | Hardesty ................. B23Q 5/04 409/201 |
| 2010/0318222 | A1 | 12/2010 | Khoshnevis |
| 2012/0097097 | A1* | 4/2012 | Ikushima ................ B05B 3/026 118/300 |
| 2016/0271871 | A1* | 9/2016 | Lee ..................... B29C 67/0055 |

\* cited by examiner

ADDITIVE MANUFACTURING APPARATUS

CROSS-REFERENCE TO RELATED APPLICATIONS

This application is a continuation application of U.S. application Ser. No. 14/701,631, filed May 1, 2015, now U.S. Pat. No. 9,713,902, the entirety of which is herein incorporated by reference.

This invention relates to an apparatus for forming a configured article and more particularly to such an apparatus provided with improved means for effectively and economically forming such article by an extrusion process.

BACKGROUND OF THE INVENTION

In the prior art, there has been developed a process commonly referred to as an additive manufacturing process which generally consists of forming various bodies by extruding a bead of a molten thermoplastic material, applying such bead of molten material in a strata of layers to form a replica of an article sought to be formed and then machining such replica when cooled to remove excess material and provide the final configuration of the intended article. In practicing such process, several aspects thereof have been noted. In procedures where thick beads of molten material are produced, it has been found that an oversized replica of the intended article results, requiring excessive machining in producing the final article configuration, requiring increased production time and excessive scarp material. In forming comparatively large articles, it further has been found that lain strata of extruded material are apt to cool thereby impairing the fusion of a layer of molten material applied thereon. Such lack of fusion may be overcome by tamping an overlying, molten bead segment to induce fusion. Such remedial measure however, has the effect of causing the bulging of applied layers, often requiring additional machining. In seeking to overcome the disadvantages of the use of thick beads of molten material, thin beads of material have been employed. Such use has been effective in reducing machine time but results in a substantial increase in overall production time thereby negatively affecting productively.

In view of the foregoing, it is the principal object of the present invention to provide an improved apparatus for producing an article through the use of an additive material process, requiring little if any machining of a molded body in providing a final product.

BRIEF DESCRIPTION OF THE INVENTION

The principal object of the present invention is achieved by an apparatus including a worktable supported on a bed, having a support surface disposed in an x-y plane, disposed in one of a fixed condition on such bed and a displaceable condition along a y-axis; a gantry supported on such bed along an x-axis, disposed in one of a fixed condition on such bed with a worktable displaceable along the y-axis and a displaceable condition along the y-axis on such bed with such worktable disposed in a fixed condition on such bed; a carriage mounted on such gantry, displaceable along a y-axis, provided with means for forming a molten thermoplastic material extrudable through an outlet conduit thereof; a tool carrier mounted on such carriage, displaceable along a z-axis; a tool holder mounted on such tool carrier, rotatably displaceable about a z-axis; a tool support shaft provided with an axis disposed in an x-y plane, journaled in such tool holder and rotatably displaceable about the axis thereof; a dispenser conduit mounted on such tool support shaft, disposed perpendicularly relative to the axis thereof, accommodating a nozzle at an outlet end thereof; means mountable on such dispenser conduit for applying a formed, molten bead of a molten thermoplastic material; a flexible hose provided with a first end supported on such tool conduit of the material extrusion means, and a second end attached to an inlet of the dispenser conduit; a plurality of servomotors each operatively connected to one of such aforementioned components for selectively displacing such one component in one of a rotational and linear movement; and a control computer operatively connected to such servomotors for operation in execution of a program inputted into the control thereof.

DETAILED DESCRIPTION OF THE PREFERRED EMBODIMENT OF THE INVENTION

Figure 1:
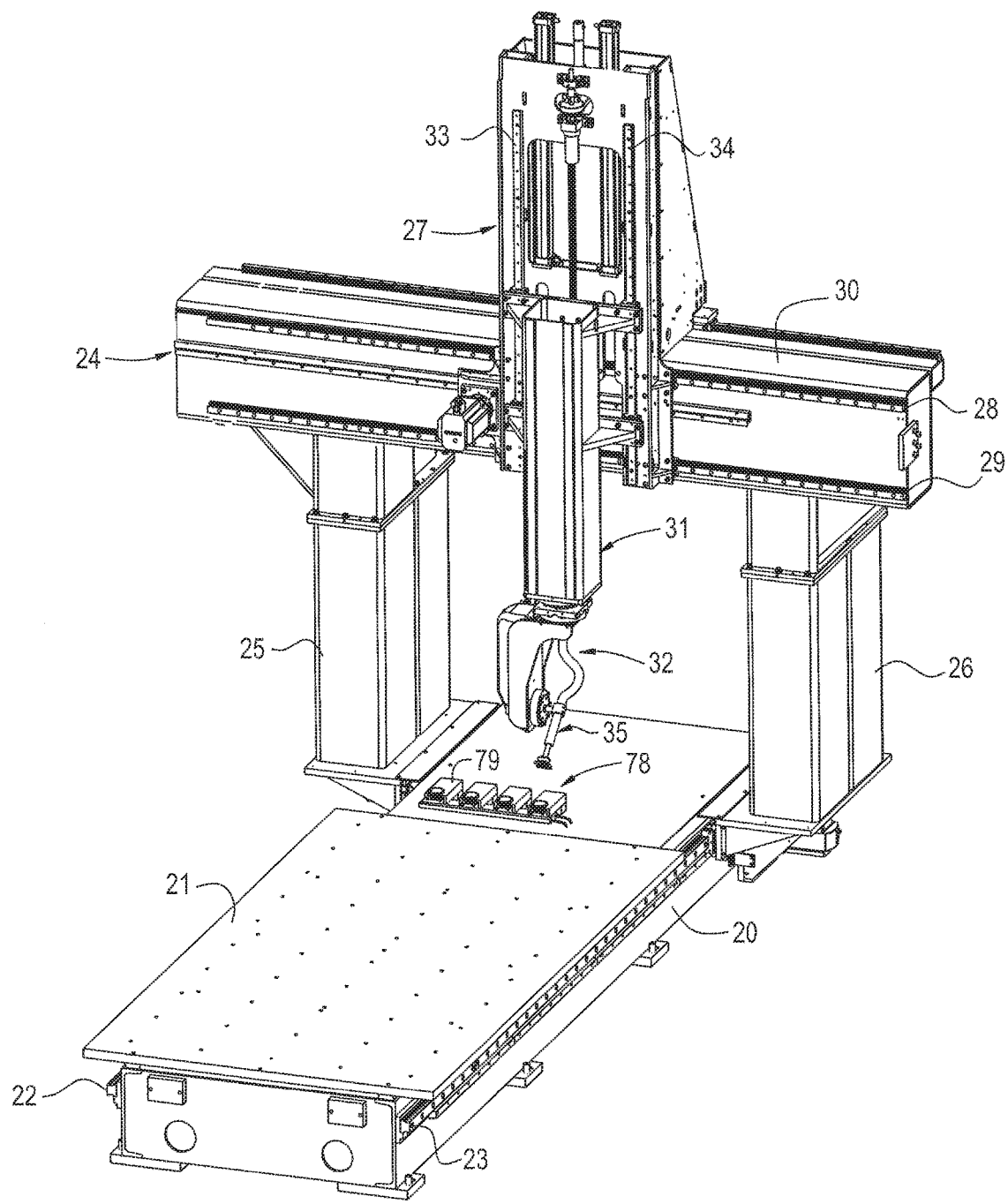
FIG. 1 is a perspective view of a CNC machine incorporating the present invention.

Referring to FIG. 1 of the drawings, there is illustrated a CNC machine which embodies the present invention. Such machine includes a bed 20, a worktable 21 having a support surface lying in an x-y plane, mounted on a set of guide rails 22 and 23 and displaceable along a y-axis by a pair of servomotors drivingly connected thereto, a gantry 24 provided with a pair of laterally spaced legs 25 and 26 supported on bed 20, a carriage 27 mounted on a set of guide rails 28, 29 and 30 provided on the gantry and displaceable along an x-axis by a servomotor mounted on the gantry, drivingly connected thereto and a tool carrier 31 and tool holder 32 mounted on a set of guide rails 33 and 34 provided on carriage 27 and displaceable along a z-axis by a servomotor mounted on carriage 27 and drivingly connected thereto. Such carriage further is provided with a material dispenser 35. Each of such servomotors is operatively connected to a control computer disposed on or in the vicinity of such machine, functional in executing imputed programs for displacing such components along such x, y and z axes.

Figure 2:
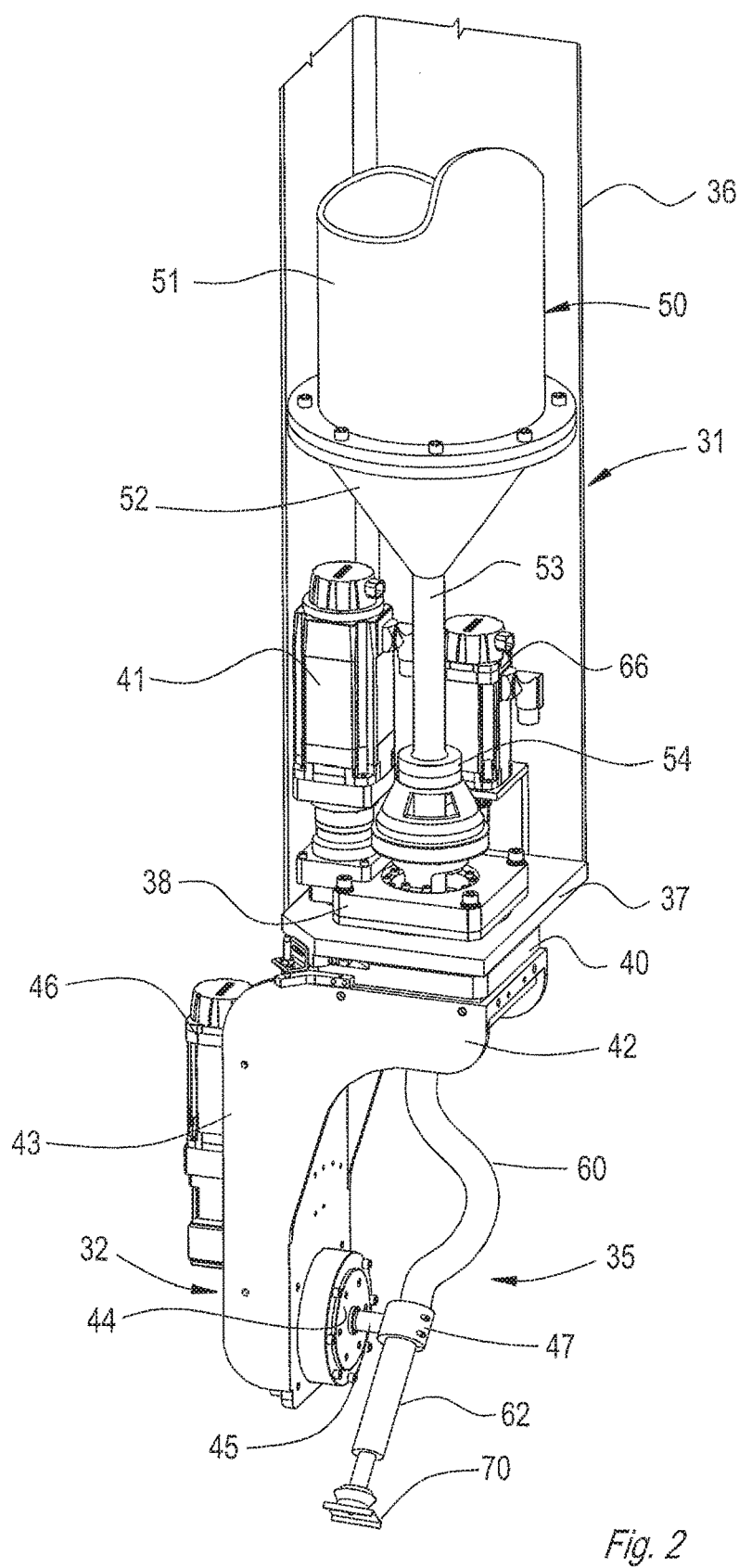
FIG. 2 is an enlarged perspective view of the CNC machine shown in FIG. 1 illustrating, the tool carrier and holder portions thereof, having portions thereof broken away.
Figure 4:
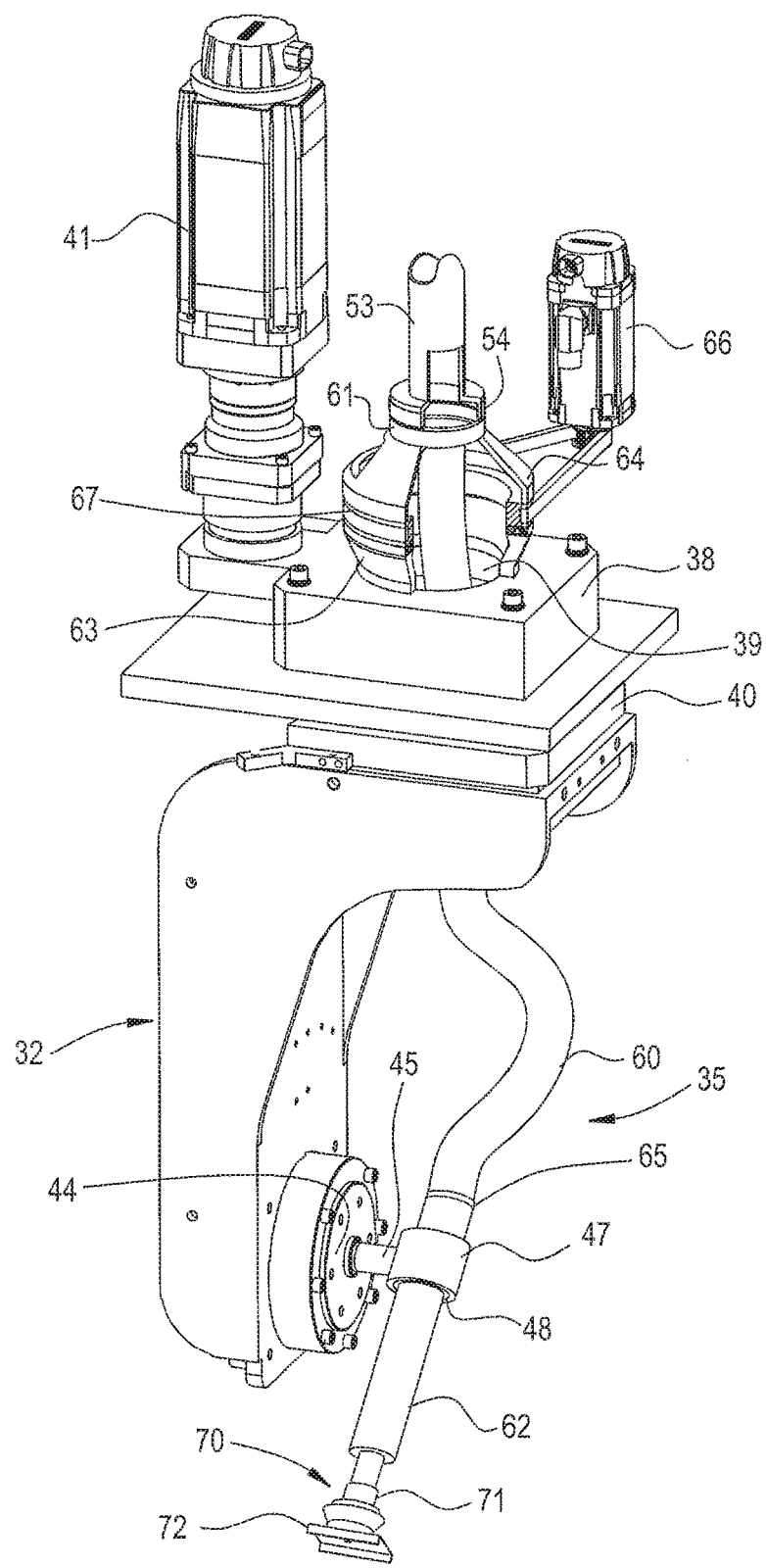
FIG. 4 is a view similar to the view shown in FIG. 2 having portions thereof broken away to more fully illustrate the connections of certain components thereof.

As best shown in FIGS. 2 and 4, carrier 31 includes a vertically disposed housing 36 provided with a support platform 37 having an opening therein disposed along a z-axis. Mounted on the upper side of platform 37 is a gear box 38 provided with an opening 39 vertically aligned with the opening in the support platform. Disposed on the underside of platform 37 is a rotable mounting platform 40 having an opening therethrough coaxial with the opening in platform 37 and gearbox 38, and connected to an annular flange of a depending drivable conduit of gearbox 38. Further mounted on support platform 37 is a servomotor 41 provided with an outlet shaft operatively connected to gearbox 38 for imparting rotational drive to mounting platform 40.

Tool holder 32 depends from carrier 31 and is rotatably displaceable relative thereto about the z-axis of gear box 38 and mounting platform 40. It includes an upper segment 42 connected to mounting platform 40, provided with an opening therethrough coaxially disposed with respect to the aligned openings in gearbox 38, support platform 37 and mounting platform 40, and a depending segment 43 spaced laterally of the z-axis of rotation of platform 40. Mounted on an inner side of segment 43 is a gearbox 44 provided with an output shaft 45 having an axis of rotation lying in an x-y plane intersecting the z-axis of rotation of the tool holder. Such shaft is rotatably displaceable about its axis by means of a servomotor 46 mounted on the depending segment of the tool holder, operatively connected to gearbox 44. Also, mounted on the end of output shaft 45 is a support conduit 47 provided with an axis intersecting both the axis of rotation of shaft 45 and the z-axis of rotation of the tool holder, and a bearing 48.

As best shown in FIG. 2, an extruder 50 of a molten thermoplastic material is provided in an upper portion of housing 36, along the z-axis of the openings in the tool carrier 31 and tool holder. Such extruder 50 includes an upper cylindrical portion 51 provided with a heater and an extruding mechanism for forming and extruding therefrom a molten thermoplastic material, through a lower funnel portion 52 and an outlet tube 53 disposed along the z-axis of the aligned openings in gearbox 38, support platform 37, and rotatable mounting platform 40. An annular collar 54 further is provided at the outlet end of tube 53.

Material applicator 35 as best shown in FIG. 4 includes an insulated, flexible conduit 60 provided with a metallic rim 61 at one end thereof and a rigid, metallic dispenser conduit 62 at the other end thereof.

Mounted on gearbox 38 is an annular base member 63, on which an annular swivel member 64 is rotatably mounted. Rim 61 of hose 60 is rigidly, concentrically connected to swivel member 64 and forms a rotatable union with collar 54 of extruder outlet conduit 53 of extruder 50 to provide a molten material path into and through the upper end of flexible hose 60. The other end of hose 60 is connected to an inlet end of dispenser 62 through an adapter 65. Swivel member 64 along with fixedly mounted tube rim 61 are rotatably displaceable between base member 63 and extruder tube collar 54 by means of a servomotor 66 mounted in support platform 37 and a pulley 67 entrained about a sheave provided on the output shaft of motor 66 and a sheave portion of swivel member 64. Servomotors 41, 46 and 66 also are operated by the control computer pursuant to the execution of an inputted program.

Mounted on the fee end of disperser tube 62 is a material applicator device 70 including a base component 71 and a detachable component 72 of a type as illustrated and described in U.S. Patent Application Publication No. 2016/0288424, published on Oct. 6, 2016, and filed on Apr. 3, 2015, as U.S. application Ser. No. 14/678,286. Generally, component 72 includes an annular segment 73 provided with an annular recess 74 with an axial opening therethrough, and a molten material shaping segment 75 provided with a material guide channel 76, and component 71 which includes a tubular segment 77 insertable in dispenser tube 62, and an appendage segment 78 detachably receivable in the recessed segment of component 72, provided with an opening communicable with the axial passage in component 72 and means for detachably connecting such components together as shown in FIG. 6.

Figure 5:
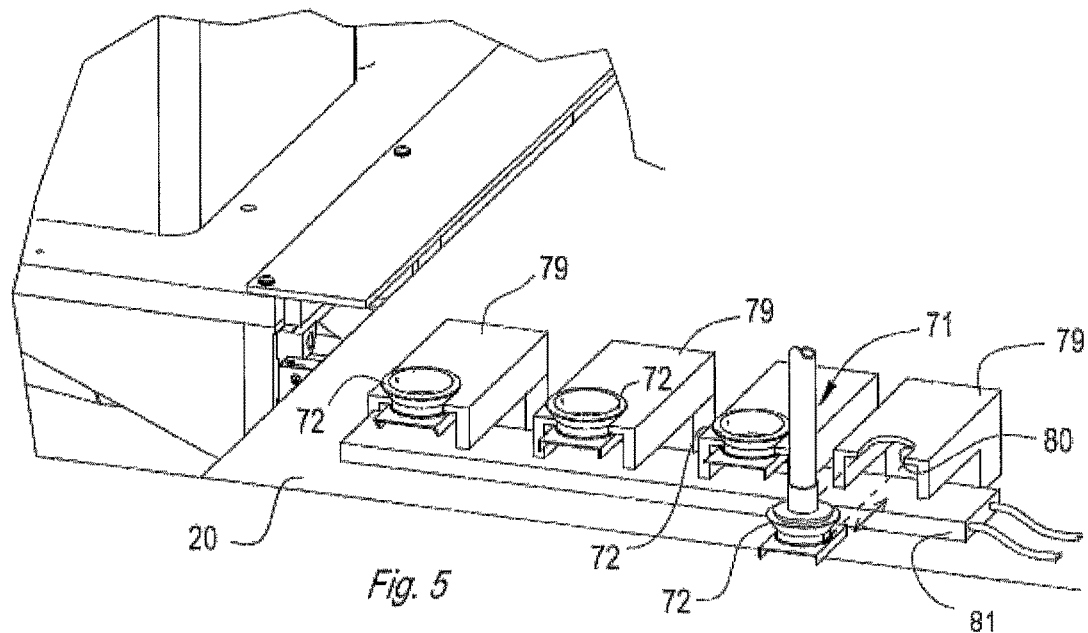
FIG. 5 is a perspective view of a storage rack provided on the worktable of the machine shown in FIG. 1, accommodating a number of applicator components, each provided with a material applying channel having a unique cross-sectional configuration.
Figure 6:
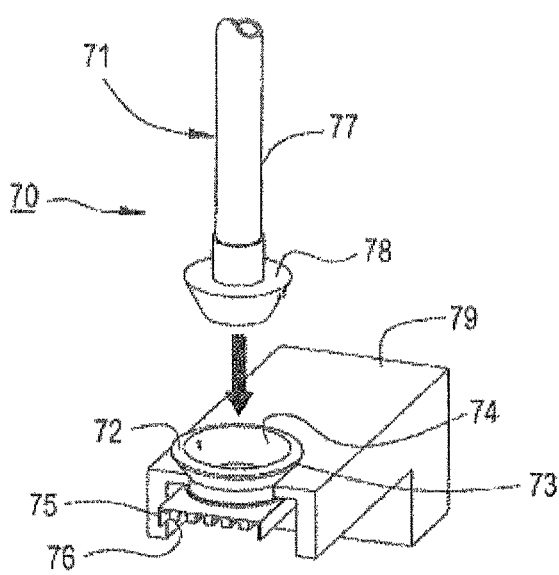
FIG. 6 is a perspective view of a holding bracket of the rack shown in FIG. 5, illustrating the manner by which a detachable applicator component of a device as shown in FIGS. 1 through 4 may be displaced to attach to and be displaced from a selected rack.

An array of components 72, each provided with a differently configured guide channel 76, is provided, mounted on an array of holders 79 positioned on the bed of the machine, as shown in FIGS. 1 and 6, accessible to the tool holder. A leading edge of the top wall of each holder 79 is provided with a recess 80 adapted to receive and support a segment 73 of a component 72. Each segment 73 is provided with a parallel set of laterally opening slots, in the sides thereof, adapted to receive the opposed side edges of the recess of a holder when such segment is slid into such recess to mount on a holder as further shown in FIG. 5. An electrically heated strip 81 also is provided on the machine bed below overextending portions of the top walls of holders 79, functional in maintaining stored segments 72 heated in accommodating the flow of heated material when in use.

In the use of the machine as described to form an article either directly on the workable thereof or on a mold mounted thereon, a supply of pellets of a thermoplastic material is fed into extruder 50, and a suitable program is inputted into the central system of the computer. Upon operation of the machine, the control system will function to heat and churn the extruder to form a molten thermoplastic material, and timely execute the inputted program in causing molten material to flow through flexible tube 60, applicator conduit 62 and dispensing device 70, and operate the several servomotors to displace device 70 linearly along the x, y and z-axes, rotatably about the x axis the axes of shaft 45 and applicator conduit 62 and combinations of such displacements, pursuant to the inputted program, in directing the application of extruded molten material in plies forming the configuration of an intended article. In the course of such operation in which a particular cross-sectional configuration of one or more plies may be required, the program will provide for maneuvering the tool carrier and holder to replace a mounted forming segment 72 by mounting an attached forming segment on a vacant holder 79 and attaching another segment 72 provided with a different, selected cross-sectional configuration.

Figure 3:
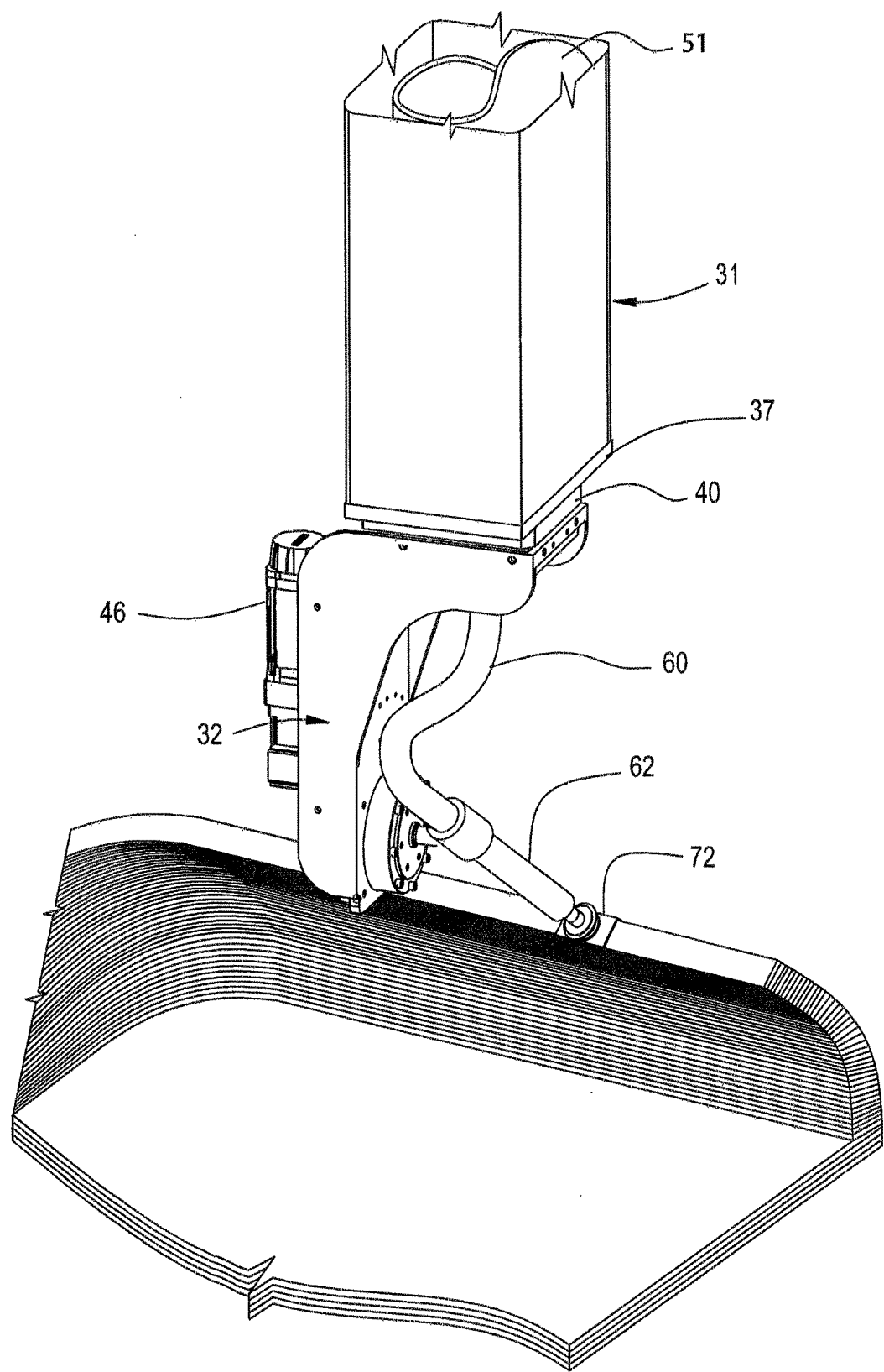
FIG. 3 is another perspective view of the tool carrier shown in FIG. 2 illustrating operation of the described device to form an article.
Figure 7:
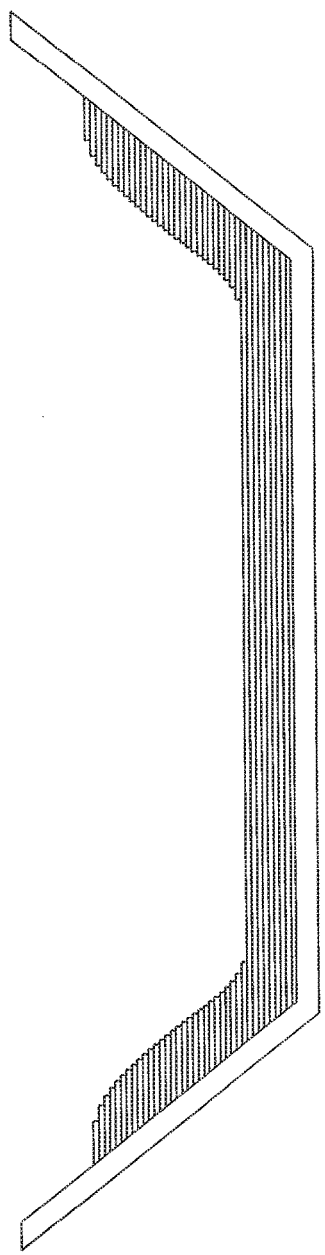
FIG. 7 is vertical, cross-sectional view of an article formed by a machine in the use of a conventional additive manufacturing process.
Figure 8:
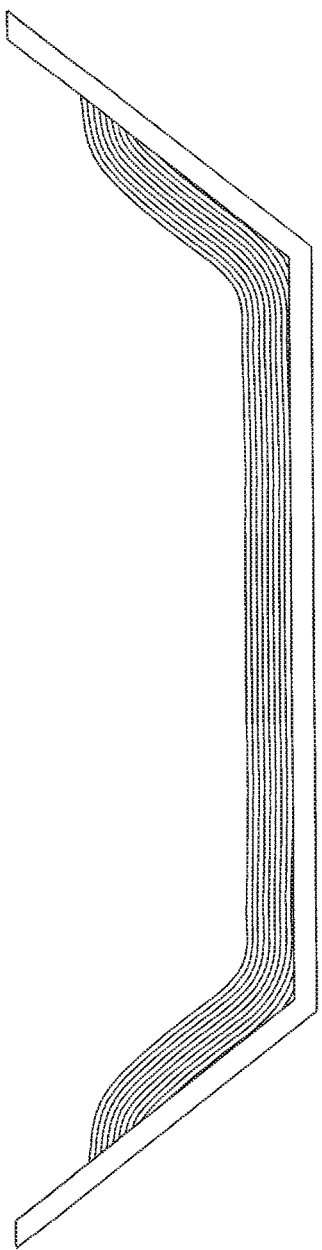
FIG. 8 is a vertical, cross-sectional view of an article formed by the use of the present invention.
Figure 9:
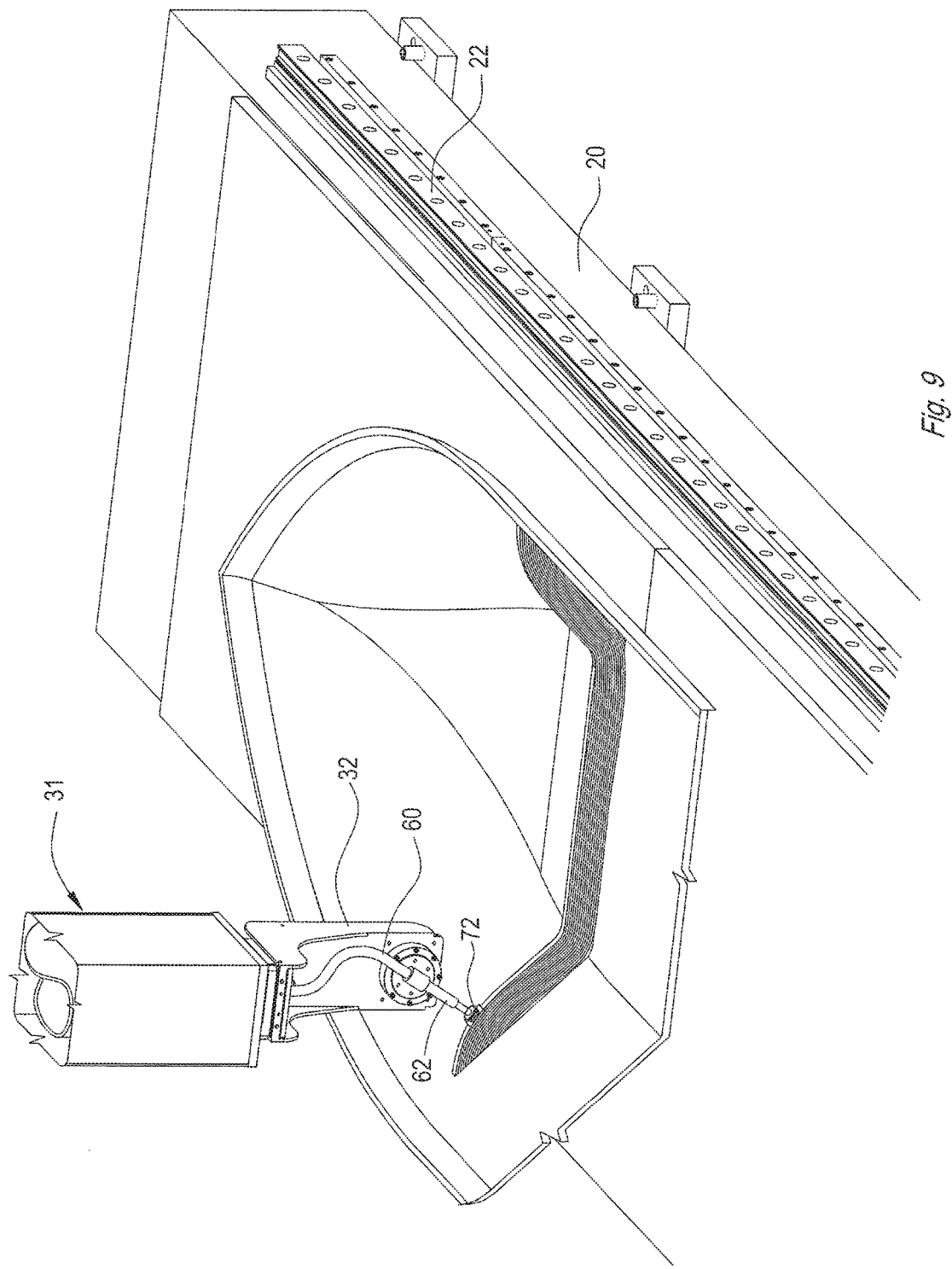
FIG. 9 is a perspective view of a portion of the present invention illustrating the formulation of a portion of the hull of a watercraft, having a portion thereof broken away.

In the use of the machine as described, the plies of molten material deposited in forming the configuration of a particular article, are not applied in strata disposed exclusively in x-y planes as illustrated in FIG. 7, which is characteristic of prior art additive manufacturing machine processors requiring the use of excess material and subsequent material removal but are applied in continuous linear and curved lines as shown in FIGS. 3 and 8, requiring less material and less if any material removal. The machine as described further may be employed to form a curved structure such as the hull of a boat as shown in FIG. 9 provided with a worktable perhaps provided with a suitably contoured recess provided with a suitable coating material.

From the foregoing detailed description, it will be evident that there are a number of changes, adaptations and modifications of the present invention, which come within the province of those persons having ordinary skill in the art to which the aforementioned invention pertains. However, it is intended that all such variations not departing from the spirit of the invention be considered as within the scope thereof as limited solely by the appended claims.

We claim:

1. An additive manufacturing system, comprising:
   a carrier including:
      a first actuator; and
      a swivel member;
   a holder rotatably mounted to the carrier, wherein the holder includes a rotatable shaft extending therefrom;
   a second actuator configured to rotate the shaft with respect to the holder; and
   a flexible tube comprising a first portion and a second portion, wherein the first portion is coupled to the swivel member, and wherein the second portion is coupled to the shaft;
   wherein actuation of the first actuator rotates the swivel member with respect to the carrier so as to rotate the flexible tube and the swivel member about a first axis, and
   wherein actuation of the second actuator rotates the shaft about a second axis, orthogonal to the first axis.

2. The system of claim 1, further comprising an extruder configured to output a flowable material to the flexible tube, wherein the extruder is disposed within the carrier, and wherein the first portion of the flexible tube includes an inlet in fluid communication with an outlet of the extruder.

3. The system of claim 2, further comprising:
   a support platform coupled to the carrier, the support platform including an opening disposed along the first axis, wherein the swivel member is disposed between the support platform and the outlet of the extruder, and wherein the outlet of the extruder and the first portion of the flexible tube form a path through the swivel member; and
   a gearbox operably coupled to the first actuator, the first actuator being configured to rotate the swivel member.

4. The system of claim 1, further comprising:
   a gantry displaceable along a third axis; and
   a carriage mounted to the gantry and displaceable along the second axis, wherein the carrier is mounted to the carriage and displaceable along the first axis.

5. The system of claim 1, wherein the shaft extends from the holder along the second axis, and wherein the first axis intersects the second axis.

6. The system of claim 1, further comprising:
   a rigid tube having a first end and a second end;
   a support conduit coupling the second portion of the flexible tube to the first end of the rigid tube, wherein the shaft is coupled to the support conduit; and
   a material applicator coupled to the second end of the rigid tube.

7. The system of claim 6, wherein the material applicator further comprises a base component and a detachable component, wherein the base component is coupled to the second end of the rigid tube, and wherein the detachable component is configured to couple to the base component.

8. The system of claim 6, wherein rotation of the shaft about the second axis deflects the rigid tube towards or away from the first axis.

9. An additive manufacturing system, comprising:
   a tool carrier having a longitudinal axis;
   a swivel member mounted within the tool carrier;
   a first actuator configured to rotate the swivel member with respect to the tool carrier;
   a holder rotatably coupled to the tool carrier and including a rotatable shaft extending therefrom, wherein the holder is rotatable about the longitudinal axis of the tool carrier;
   a second actuator configured to rotate the shaft with respect to the holder;
   a flexible tube configured to deliver a flowable material, wherein the flexible tube includes a first end portion and a second end portion, wherein the first end portion is supported by the tool carrier and the second portion is coupled to the shaft;
   a rigid tube in fluid communication with the second end portion of the flexible tube, wherein the rigid tube is configured to deflect towards and away from the longitudinal axis of the tool carrier;
   wherein actuation of the first actuator rotates the swivel member so as to rotate the flexible tube and the swivel member about the longitudinal axis of the tool carrier and relative to the tool carrier; and
   wherein actuation of the second actuator rotates the shaft about a second axis transverse to the longitudinal axis of the tool carrier.

10. The system of claim 9, further comprising an extruder configured to output a flowable material, wherein the extruder is disposed within the tool carrier, and wherein the first end portion includes an inlet in fluid communication with an outlet of the extruder.

11. The system of claim 10, further comprising:
    a support platform including an opening oriented along the longitudinal axis of the tool carrier, wherein the swivel member is disposed between the support platform and the outlet of the extruder; and
    a gearbox operably coupled to the first actuator, the first actuator being configured to rotate the swivel member.

12. The system of claim 9, further comprising:
    a gantry displaceable along a third axis; and
    a carriage mounted to the gantry and displaceable along the second axis, wherein the tool carrier is mounted to the carriage and displaceable along the longitudinal axis of the tool carrier.

13. The system of claim 9, wherein the shaft extends from the holder along the second axis, and wherein the longitudinal axis of the tool carrier intersects the second axis.

14. The system of claim 9, wherein the rigid tube further comprises a first end portion and a second end portion, wherein the system further comprises:
    a support conduit coupling the second end portion of the flexible tube to the first end portion of the rigid tube, and wherein the support conduit is further coupled to the shaft.

15. The system of claim 14, further comprising a material applicator coupled to the second end portion of the rigid tube.

16. The system of claim 15, wherein the material applicator further comprises a base component and a detachable component, wherein the base component is coupled to the second end of the rigid tube, and wherein the detachable component is configured to couple to the base component.

17. An additive manufacturing system, comprising:
    a carrier including:
       a first actuator; and
       a swivel member;
    a holder including a gearbox and a shaft extending from the gearbox;

a second actuator configured to rotate the shaft via the gearbox; and a flexible tube comprising a first portion and a second portion, wherein the first portion is coupled to the swivel member, and wherein the second portion is coupled to the shaft;

an extruder disposed within the carrier, the extruder configured to output a flowable material to the flexible tube, the first portion of the flexible tube including an inlet in fluid communication with an outlet of the extruder;

wherein actuation of the first actuator rotates the swivel member with respect to the carrier so as to rotate the swivel member and the flexible tube about a first axis;

wherein actuation of the second actuator rotates the shaft with respect to the holder about a second axis, orthogonal to the first axis; and wherein the first portion of the tube extends through a part of the swivel member and forms a path with the outlet of the extruder through the swivel member.

18. The system of claim 17, further comprising:

a support platform coupled to the carrier, the support platform including an opening disposed along the first axis, wherein the swivel member is disposed between the support platform and the outlet of the extruder.

19. The system of claim 17, wherein the shaft extends from the holder along the second axis orthogonal to the first axis.

20. The system of claim 17, further including a support conduit coupled to the shaft, wherein the support conduit connects the second portion of the flexible tube to an end of the shaft.

21. The system of claim 20, wherein the support conduit includes a central longitudinal axis intersecting both the first axis and the second axis.

22. The system of claim 20, further including a rigid tube having a first end coupled to the support conduit and a second end coupled to an applicator.

23. The system of claim 1, wherein the flexible tube extends through the swivel member.

* * * * *